United States Patent [19]

Hall et al.

[11] Patent Number: 4,496,033
[45] Date of Patent: Jan. 29, 1985

[54] DUAL PISTON ACTUATOR

[75] Inventors: John M. Hall, Uniontown; Milan Pantic, Akron, both of Ohio

[73] Assignee: Goodyear Aerospace Corporation, Akron, Ohio

[21] Appl. No.: 334,707

[22] Filed: Dec. 28, 1981

[51] Int. Cl.³ .......................... B60T 11/00; F01B 7/20
[52] U.S. Cl. ...................... 188/347; 91/173; 92/52; 92/60; 92/63; 92/132; 188/72.4; 188/348
[58] Field of Search ................. 92/51, 52, 53, 63, 132, 92/6 R, 6 D, 60; 91/519, 170 R, 173; 188/348, 72.4, 370, 347

[56] References Cited

U.S. PATENT DOCUMENTS

| 2,826,277 | 3/1958 | Hawley | 188/152 |
|---|---|---|---|
| 3,191,506 | 6/1965 | Ledeen | 92/60 |
| 3,584,536 | 6/1971 | Hillberry | 91/519 |
| 3,687,015 | 8/1972 | Chavarria | 92/132 |
| 3,831,999 | 8/1974 | Sonneborn | 92/52 |
| 4,000,758 | 1/1977 | Meisenheimer, Jr. | 92/63 |
| 4,125,059 | 11/1978 | Tuji | 92/63 |
| 4,195,714 | 4/1980 | Massing | 92/52 |
| 4,306,639 | 12/1981 | Mitchell | 92/132 |
| 4,341,105 | 7/1982 | Gerrick, Jr. | 92/52 |
| 4,375,781 | 3/1983 | Bessho | 92/52 |

FOREIGN PATENT DOCUMENTS 432023 6/1974 U.S.S.R. .................... 91/519

Primary Examiner—Abraham Hershkovitz
Attorney, Agent, or Firm—P. E. Milliken; L. A. Germain

[57] ABSTRACT

A pair of axially aligned and nested pistons are mounted in a pressure sealed arrangement within the bore of a pressure housing. A primary piston is moved in response to increasing pressure to provide an actuating output force while a secondary piston simultaneously moves to overcome a reverse bias on it by a tension spring and adds to the actuating force by engaging the primary piston only when the pressure exceeds a specific higher threshold. The primary and secondary pistons thereafter operate in conjunction under the influence of high pressure to provide the output actuating force.

1 Claim, 5 Drawing Figures

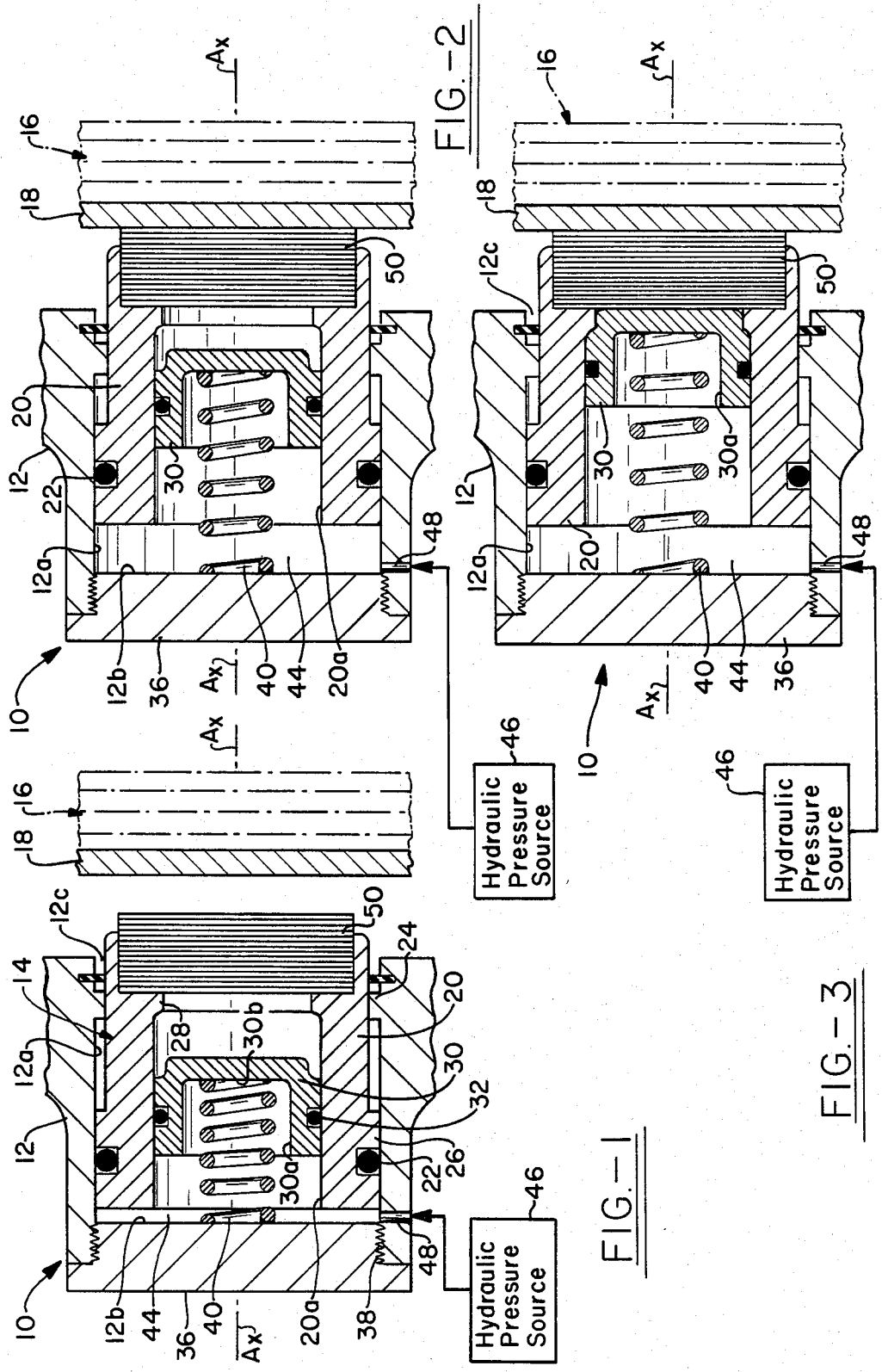

DUAL PISTON ACTUATOR

BACKGROUND OF THE INVENTION

This invention generally relates to hydraulic actuators and more particularly to a disk brake actuator as may be applied to aircraft type disk brake assemblies.

Disk brake assemblies of the type alluded to are conventionally full circle configurations which incorporate at least two piston actuators in a balanced arrangement about the circle and which operate to move a pressure plate into engagement with a disk brake stack comprised of alternating stationary and rotating disk elements. The prior art piston actuators conventionally employ a single piston which results in a linear relationship between the disk interface pressure and the brake system pressure as illustrated by the dashed line showing of FIG. 4. Also, and as illustrated in FIG. 5, these prior art actuators have a step-like displacement vs. pressure characteristic.

Accordingly, it is a purpose of this invention to provide an actuator which has a more gradual and changing linear relationship between the interface pressure and the system pressure as illustrated by the solid line showing in FIG. 4. Also, the invention provides a variable displacement vs. pressure characteristic as shown by the solid line portion of FIG. 5.

SUMMARY OF THE INVENTION

The beforementioned and other advantages of the invention are provided in an actuator comprising a pair of axially aligned and nested pistons mounted in a pressure sealed arrangement within the bore of a pressure housing. A primary piston is moved in response to an increasing pressure to provide an actuating output force while a secondary piston also moves but is under the influence of a reverse bias exerted on it by a tension spring and adds to the actuating output force only when the pressure exceeds a threshold level which overcomes the reverse spring bias. The primary and secondary pistons thereafter operate in conjunction under the influence of the high pressure to provide the output actuating force.

DESCRIPTION OF THE DRAWINGS

The various objects and advantages of the invention will become more apparent and fully understood and appreciated from a consideration of the following description when taken in conjunction with the accompanying drawings in the several figures of which like reference numerals indicate like elements and in which:

FIG. 1 is a sectional elevational view of an actuator in accordance with this invention as it may be applied to a disk brake application and operating in a "brake disengaged" position;

FIG. 2 is a sectional elevational view similar to FIG. 1 but showing the actuator in a "brake engaged" position due to an increasing hydraulic pressure;

FIG. 3 is a sectional elevational view similar to FIG. 1 but showing the actuator in a "brake engaged" position due to a hydraulic pressure above a specific threshold;

DETAILED DESCRIPTION OF THE INVENTION

Figure 4:
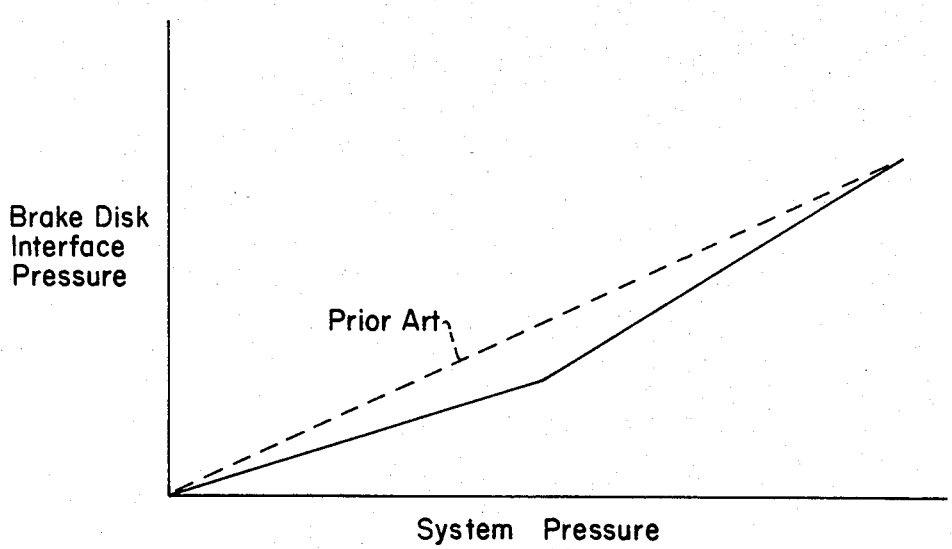
FIG. 4 is a graph of the Disk Interface Pressure vs. System Pressure characteristic for the actuator illustrated in FIG. 1 and is shown in solid lines while the characteristic for the prior art is shown in dashed lines.
Figure 5:
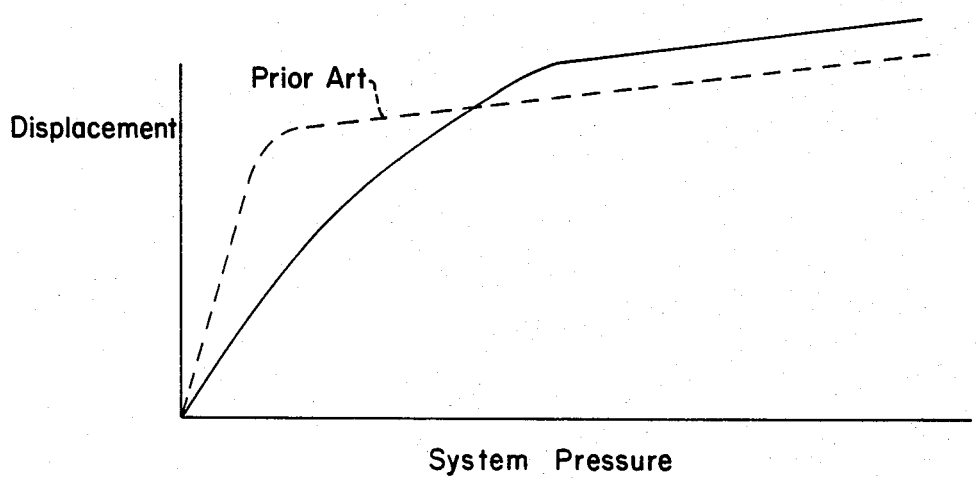
FIG. 5 is a graph of the Displacement vs. System Pressure characteristic for the actuator of FIG. 1 and is shown in solid lines while the characteristic for the prior art is shown in dashed lines.

Referring to the drawings, a hydraulically operated actuator in accordance with this invention is generally indicated by reference numeral 10. The actuator comprises a pressure housing 12 having a central axis Ax and configured to define a primary bore 12a having a closed end 12b and an open end 12c. The bore 12a is adapted for receiving piston means generally indicated by reference numeral 14, which piston means moves out of the housing 12 under the influence of a hydraulic pressure force to effect inter-engagement of a brake stack 16 (shown in ghost lines) comprised of alternating stationary and rotating disk elements through its engagement with a pressure plate 18.

The piston means 14 comprises a primary piston 20 slidably received within the primary bore 12a and pressure sealed within the bore via an annular seal 22. The housing bore 12a is characterized by an internally depending annular flange 24 about the open end 12c thereof which acts as a stop to the piston 20 which has an exterior annular flange 26, the flange 26 limiting the outwardly movement of the piston when it abuts the piston stop flange 24. The piston 20 is further characterized by an axial bore 20a which receives a secondary piston 30 therein in a nested and axial relationship with respect to the primary piston 20.

The secondary piston 30 is pressure sealed within the bore 20a via an annular seal 32 and is stopped or limited in its outward excursion by an annular piston stop flange 28 within the bore 20a. The secondary piston 30 is connected to a tension spring 40 that reverse-biases the piston toward the closed end 12b of the primary bore by reason of its being attached to an end-plate 36 which forms the closed end of the bore 12a. The end plate 36 may be affixed to the housing by any conventional method such as by threads 38 which provides convenient removal and access into the housing 12. The spring 40 is also affixed to the back end of the secondary piston 30 and in this respect it may be mounted through a bore 30a within the piston 30 and affixed to the inside of the piston head as at 30b.

The primary piston 20, the secondary piston 30, and the back plate 36 define a pressure chamber 44 which is connected to a source of hydraulic fluid pressure 46 through a convenient access port 48.

In operation and as an increasing hydraulic pressure is applied to the chamber 44, the primary piston 20 is moved outwardly of the bore 12a to engage the pressure plate 18 which effects inter-engagement of the disks of the brake stack 16 and braking is initiated as illustrated in FIG. 2. Simultaneously, piston 30 is also moved by the increasing pressure but it is restrained from exerting any output force by a reverse bias imposed on it by the tension spring 40. As the input pressure increases and ultimately reaches a specific threshold level is determined by the spring constant and the relative piston areas, the force on the secondary piston 30 overcomes the spring bias and it is moved into engagement with the primary piston 20. Thereafter, the combined effects of the primary and secondary pistons 20,30 operate to exert an output force on the pressure plate 18 as illustrated in FIG. 3. Thus, it will be appreciated that the dual nested piston configuration of this invention provides a changing pressure force relationship when transitioning from low to high pressure actuation. Further it will be appreciated that by a choice of spring constant for the tension spring 40 and the relative working areas of the pistons 20,30 various thresholds may be achieved whereby the secondary piston 30 contributes to the applied output force exerted by the primary piston 20.

In the application of the invention to an aircraft disk brake system wherein the generation of heat in the braking operation may be of concern, an insulator 50 may be affixed to the forward end of the primary piston 20 to provide heat isolation of the actuator. Of course, any of the known materials may be used for this purpose and the application of such is considered within the knowledge of those skilled in the art.

While certain representations and details have been shown and described for the purpose of illustrating the invention, it will be apparent to those skilled in the art that various changes and modifications may be made therein without departing from the spirit or scope of the invention.

What is claimed is:

1. In an aircraft hydraulic disk brake system, an actuator for applying an axial force on a disk brake stack to effect brake actuation by compression of the disk stack comprising:

- a housing defining a primary bore having a closed end and an open end and a central axis;
- a primary piston slidably and sealingly mounted within the primary bore to move axially within the bore to effect an output brake actuation force, said piston defining a secondary bore axially aligned with the primary bore;
- a secondary piston slidably and sealingly mounted within the secondary bore, said primary and secondary pistons and the closed end of the housing defining a pressure chamber;
- a tension spring fastened to the closed end of the housing at one of its ends and to the secondary piston at the opposite end to apply a reverse bias on said secondary piston; and
- means communicating hydraulic fluid pressure to the pressure chamber to provide an increasing pressure force on said pistons, the primary piston movable in response to the hydraulic pressure to provide an output force that effects brake actuation while the secondary piston moves with the primary piston and adds to the output actuation force only when the hydraulic pressure exceeds a threshold value as established by the tension spring and the relative area of the pistons whereupon the secondary piston engages the primary piston and the combined effect of the primary and secondary pistons provides an increasing output brake actuation force.

* * * * *